US012115787B2

(12) United States Patent
Kawamura et al.

(10) Patent No.: US 12,115,787 B2
(45) Date of Patent: Oct. 15, 2024

(54) LIQUID EJECTION HEAD AND METHOD OF MANUFACTURING LIQUID EJECTION HEAD

(71) Applicant: CANON KABUSHIKI KAISHA, Tokyo (JP)

(72) Inventors: Shogo Kawamura, Kanagawa (JP); Takuya Iwano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 17/848,475

(22) Filed: Jun. 24, 2022

(65) Prior Publication Data

US 2023/0001703 A1 Jan. 5, 2023

(30) Foreign Application Priority Data

Jun. 30, 2021 (JP) ................................ 2021-109358

(51) Int. Cl.
*B41J 2/14* (2006.01)

(52) U.S. Cl.
CPC ......... *B41J 2/1408* (2013.01); *B41J 2/14024* (2013.01); *B41J 2002/14306* (2013.01); *B41J 2202/08* (2013.01); *B41J 2202/19* (2013.01); *B41J 2202/20* (2013.01)

(58) Field of Classification Search
CPC .................. B41J 2/1408; B41J 2/14024; B41J 2002/14306; B41J 2202/08; B41J 2202/19; B41J 2202/20
See application file for complete search history.

(56) References Cited

U.S. PATENT DOCUMENTS 7,414,641 B2 8/2008 Sasaki et al.
8,851,660 B2 * 10/2014 Furukawa ............. B41J 2/1623 347/100

FOREIGN PATENT DOCUMENTS

JP 2007-175981 A 7/2007

* cited by examiner

*Primary Examiner* — Geoffrey S Mruk
(74) *Attorney, Agent, or Firm* — Venable LLP

(57) ABSTRACT

A liquid ejection head with which print of good print quality can be obtained and a method of manufacturing the liquid ejection head are provided. For that purpose, warped flow path members are joined to each other as flow path members used for a print head to form a flow path member warped in a direction opposite to a direction of warpage due to a temperature rise during printing.

13 Claims, 14 Drawing Sheets

LIQUID EJECTION HEAD AND METHOD OF MANUFACTURING LIQUID EJECTION HEAD

BACKGROUND OF THE INVENTION

Field of the Invention

The present invention relates to a liquid ejection head for ejecting a liquid and a method of manufacturing the liquid ejection head.

Description of the Related Art

Japanese Patent Laid-Open No. 2007-175981 discloses that in curing a sealing resin between a printed circuit board and a head substrate on which a heating element is mounted, the head substrate is warped convexly due to heat shrinkage during curing of the sealing resin, and then, the head substrate is made linear by offsetting the convex warpage by concave warpage generated in the head substrate due to heat generated by the heating element during printing.

However, in the case of using a highly rigid material for the liquid ejection head, even in a case where the method of Japanese Patent Laid-Open No. 2007-175981 is used to offset the warpage of the highly rigid material caused by heat generation, the amount of warpage which can be obtained through the heat shrinkage at the time of curing of the sealing resin may not be enough to offset the warpage that occurs in the highly rigid material. As a result, there is a possibility that a print result of good print quality cannot be obtained with the liquid ejection head manufactured by the method in Japanese Patent Laid-Open No. 2007-175981.

SUMMARY OF THE INVENTION

Thus, the present invention provides a liquid ejection head with which print of good print quality can be obtained and a method of manufacturing the liquid ejection head.

Therefore, the liquid ejection head of the present invention includes an element substrate including a plurality of ejection ports configured to eject a liquid and an element configured to generate energy for ejecting the liquid from the ejection ports, a first flow path member including a surface on which the plurality of element substrates are arranged and mounted and a portion of a flow path configured to supply the ejection ports with the liquid, and a second flow path member configured to form a liquid supply member including a flow path by being laminated with the first flow path member, the liquid supply member being warped convexly in a first direction during ejection of the liquid, the liquid ejection head further including a support member configured to support the liquid supply member. The liquid supply member warped concavely in the first direction in a state where no liquid is ejected has both end portions in an arranging direction in which the element substrates are arranged, both the end portions being fixed to the support member by a fixing member and a biasing member which is combined with the fixing member and can bias an object to be fixed by the fixing member.

According to the present invention, it is possible to provide a liquid ejection head with which print of good print quality can be obtained and a method of manufacturing the liquid ejection head.

Further features of the present invention will become apparent from the following description of exemplary embodiments with reference to the attached drawings.

DESCRIPTION OF THE EMBODIMENTS

First Embodiment

A description will be given below of a first embodiment of the present invention with reference to the drawings.

Figure 1:
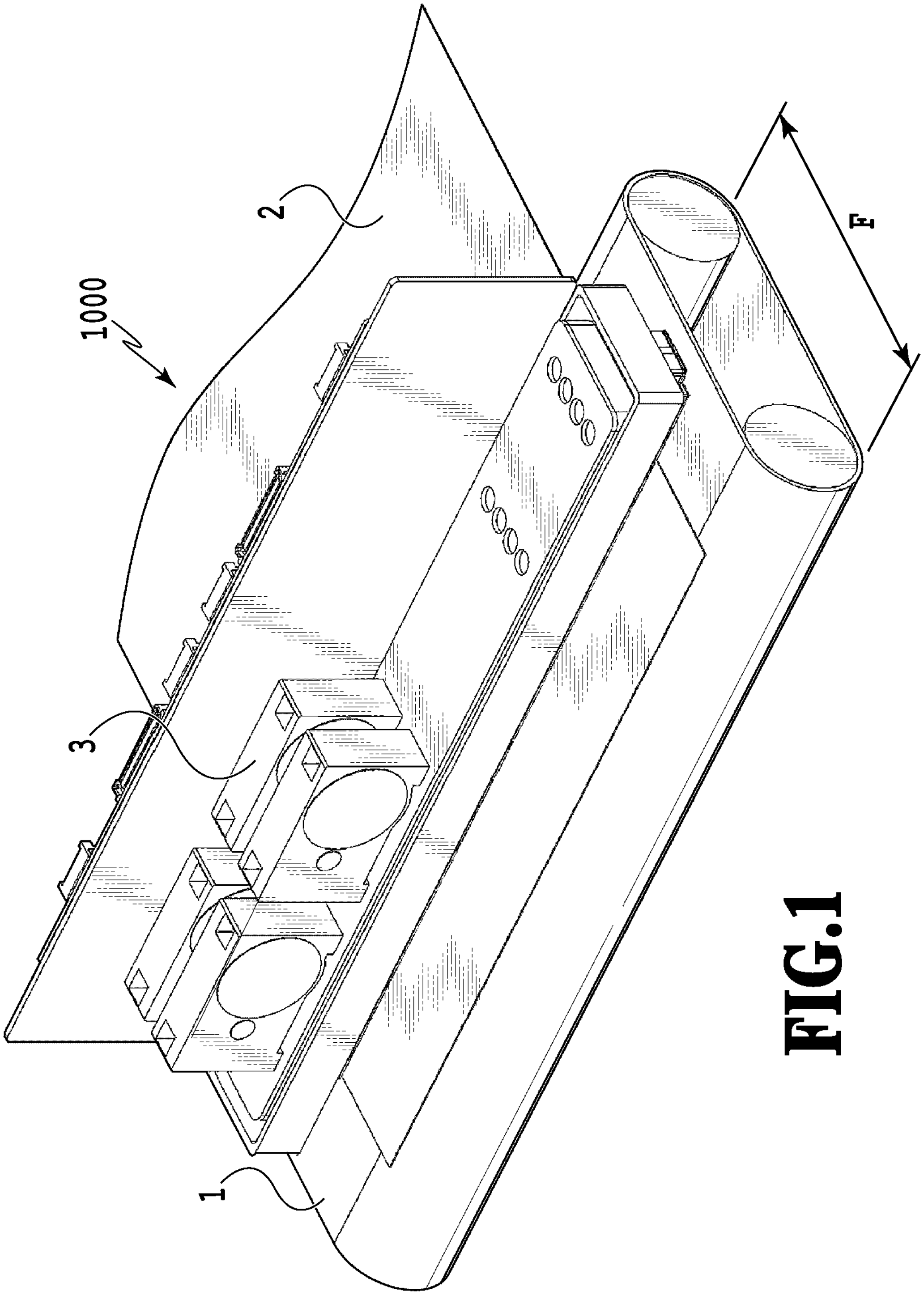
FIG. 1 is a perspective view showing a schematic configuration of a liquid ejection apparatus.

FIG. 1 is a perspective view showing a schematic configuration of a liquid ejection apparatus 1000. The liquid ejection apparatus 1000 includes a conveyance unit 1 configured to convey a print medium 2 and a linear liquid ejection head 3 arranged substantially orthogonal to a conveyance direction of the print medium 2, and is a linear printing apparatus which performs continuous printing while conveying a plurality of print media 2 continuously or intermittently. The print medium 2 is not limited to cut paper, but may be continuous roll paper. The liquid ejection head 3 is capable of full-color printing with CMYK inks (cyan: C, magenta: M, yellow: Y, black: K). As will be described later, a liquid supply means, a main tank, and a buffer tank (see FIG. 2 to be described later), which are supply paths for supplying the liquid to the liquid ejection head 3, are fluidly connected. Further, an electric control unit configured to transmit power and an ejection control signal to the liquid ejection head 3 is electrically connected to the liquid ejection head 3. A liquid path and an electric signal path in the liquid ejection head 3 will be described later.

Figure 2:
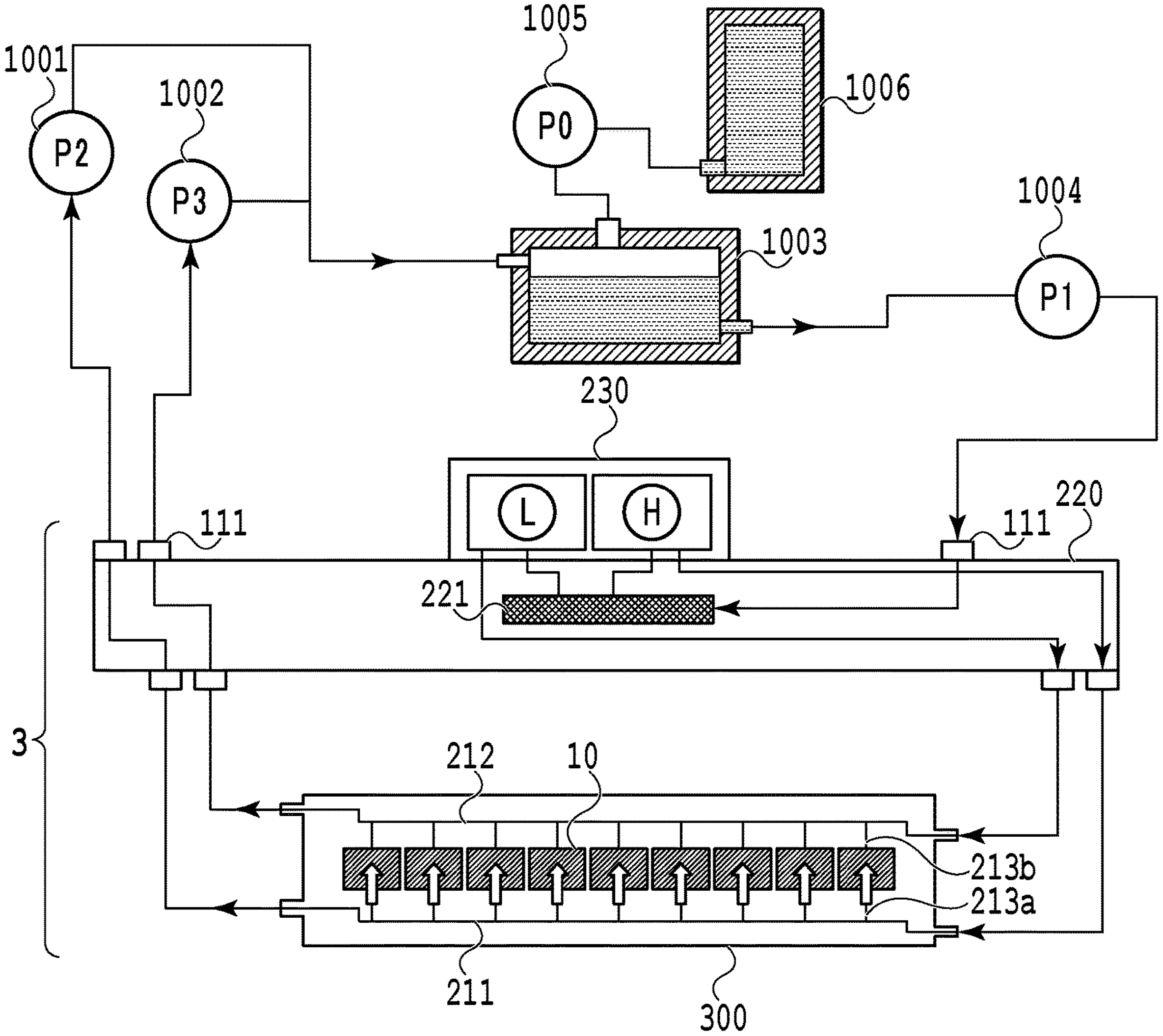
FIG. 2 is a schematic diagram showing a first circulation path which is one form of a circulation path.

FIG. 2 is a schematic diagram showing a first circulation path which is one form of a circulation path applied to the liquid ejection apparatus 1000 of the present embodiment. In the present embodiment, a description will be given of the liquid ejection apparatus 1000 in which a liquid such as ink is circulated between a buffer tank 1003 and the liquid ejection head 3, but the apparatus may be in another form. For example, two tanks may be provided on an upstream side and downstream side of the liquid ejection head without circulating a liquid such as ink to flow the ink from one tank to the other tank, so that the ink in a pressure chamber is flowed. It should be noted that FIG. 2 shows only a path through which ink of one color of the CMYK inks flows in order to simplify a description.

In the liquid ejection apparatus 1000, the liquid ejection head 3, a first circulation pump 1002, and the buffer tank 1003 are fluidly connected. A liquid ejection unit (liquid supply member) 300 is provided with a common supply path 211, a common collecting flow path 212, and an individual supply flow path 213*a* and an individual collecting flow path 213*b* in communication with respective print element substrates. The individual supply flow path 213*a* is in communication with the common supply path 211, and the individual collecting flow path 213*b* is in communication with the common collecting flow path 212. Thus, a portion of a liquid flowed with the first circulation pump 1002 flows from the common supply flow path 211 through an inner flow path of the print element substrate 10 to the common collecting flow path 212. This is because a pressure difference is provided between a pressure adjusting mechanism H connected to the common supply flow path 211 and a pressure adjusting mechanism L connected to the common collecting flow path 212 and the first circulation pump 1002 is connected only to the common collecting flow path 212.

In this way, in the liquid ejection unit 300, the flow of the liquid passing through the common collecting flow path 212 and a flow from the common supply flow path 211 through each print element substrate 10 into the common collecting flow path 212 occur. Thus, heat generated in each print element substrate 10 can be discharged to the outside of the print element substrate 10 by the flow from the common supply flow path 211 to the common collecting flow path 212. Further, such a configuration can cause an ink flow even in an ejection port or a pressure chamber where printing is not performed while printing is performed by the liquid ejection head 3, so that an increase in viscosity of the ink can be suppressed at that portion. Additionally, the thickened ink and foreign matter in the ink can be discharged to the common collecting flow path 212. Therefore, the liquid ejection head 3 of the present embodiment enables high-speed and high-quality printing.

Figure 3A:
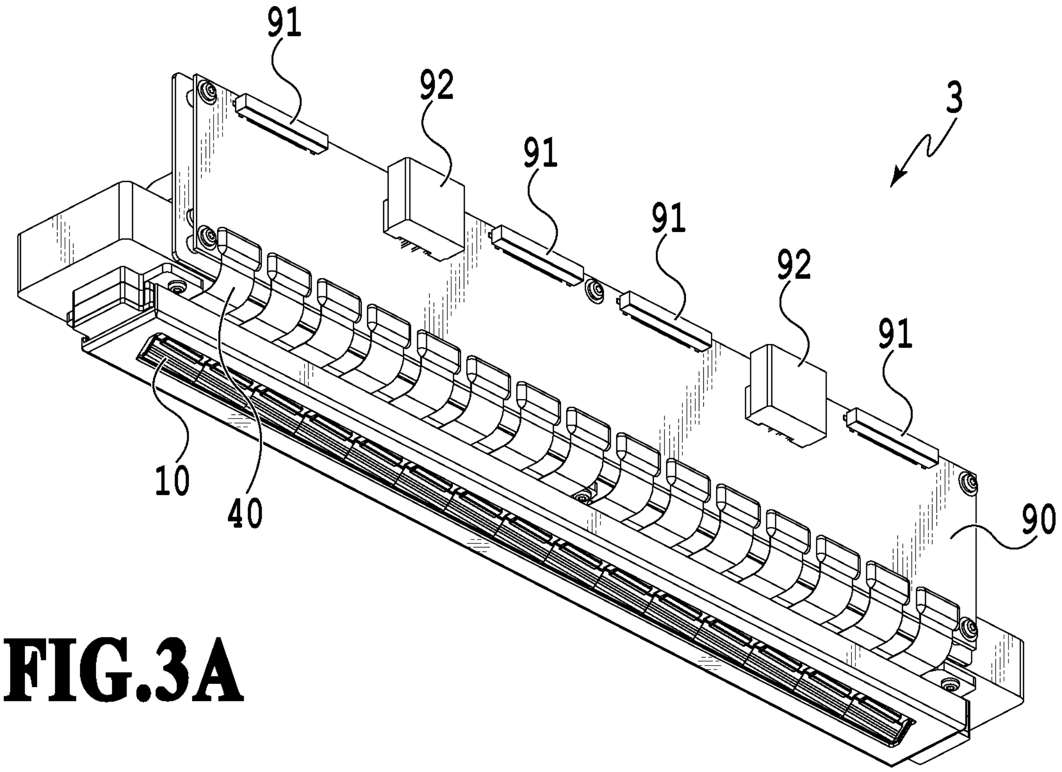
FIG. 3A is a perspective view showing a liquid ejection head.
Figure 3B:
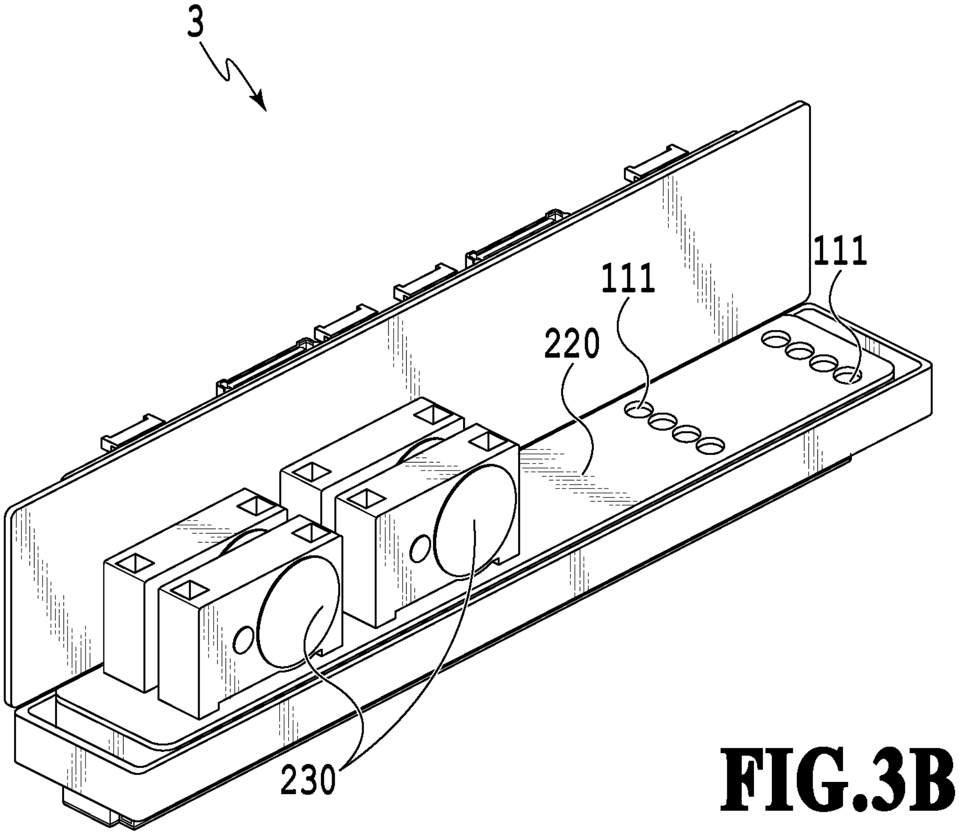
FIG. 3B is a perspective view showing the liquid ejection head.

FIGS. 3A and 3B are perspective views showing the liquid ejection head 3 in the present embodiment. The liquid ejection head 3 is a linear liquid ejection head in which 15 print element substrates 10, each of which can eject inks of a plurality of colors alone, are arranged on a straight line in an arranging direction. The liquid ejection head 3 includes each print element substrate 10, a signal input terminal 91 and a power supply terminal 92 electrically connected via a flexible wiring board 40 and an electric wiring board 90. The signal input terminal 91 and the power supply terminal 92 are electrically connected to the control unit of the liquid ejection apparatus 1000 and supply the print element substrate 10 with power required for an ejection drive signal and ejection, respectively.

A plurality of print elements are mounted on the print element substrate 10. Each of the print elements is an element that generates energy for ejecting a liquid. In the present embodiment, a heating element that generates heat is employed as a print element, and a thermal method of causing a heating element to generate bubbles in a liquid to eject the liquid is employed. However, the print element is not limited to this, and the present invention can also be applied to liquid ejection heads in which a piezoelectric method and various other liquid ejection methods are employed.

Integrating wires with an electric circuit in the electric wiring board 90 can reduce the number of signal output terminals 91 and power supply terminals 92 to less than the number of print element substrates 10. This can reduce the number of electrical connection portions that need to be removed in attaching the liquid ejection head 3 to the liquid ejection apparatus 1000 or in replacing the liquid ejection head. As shown in FIG. 3B, the liquid connection portion 111 provided on one side of the liquid ejection head 3 is connected to the liquid supply system of the liquid ejection apparatus 1000. As a result, ink is supplied from the supply system of the liquid ejection apparatus 1000 to the liquid ejection head 3, and the ink that has passed through the liquid ejection head 3 is collected to the supply system of the liquid ejection apparatus 1000. As described above, ink of each color can circulate through the path of the liquid ejection apparatus 1000 and the path of the liquid ejection head 3.

Figure 4:
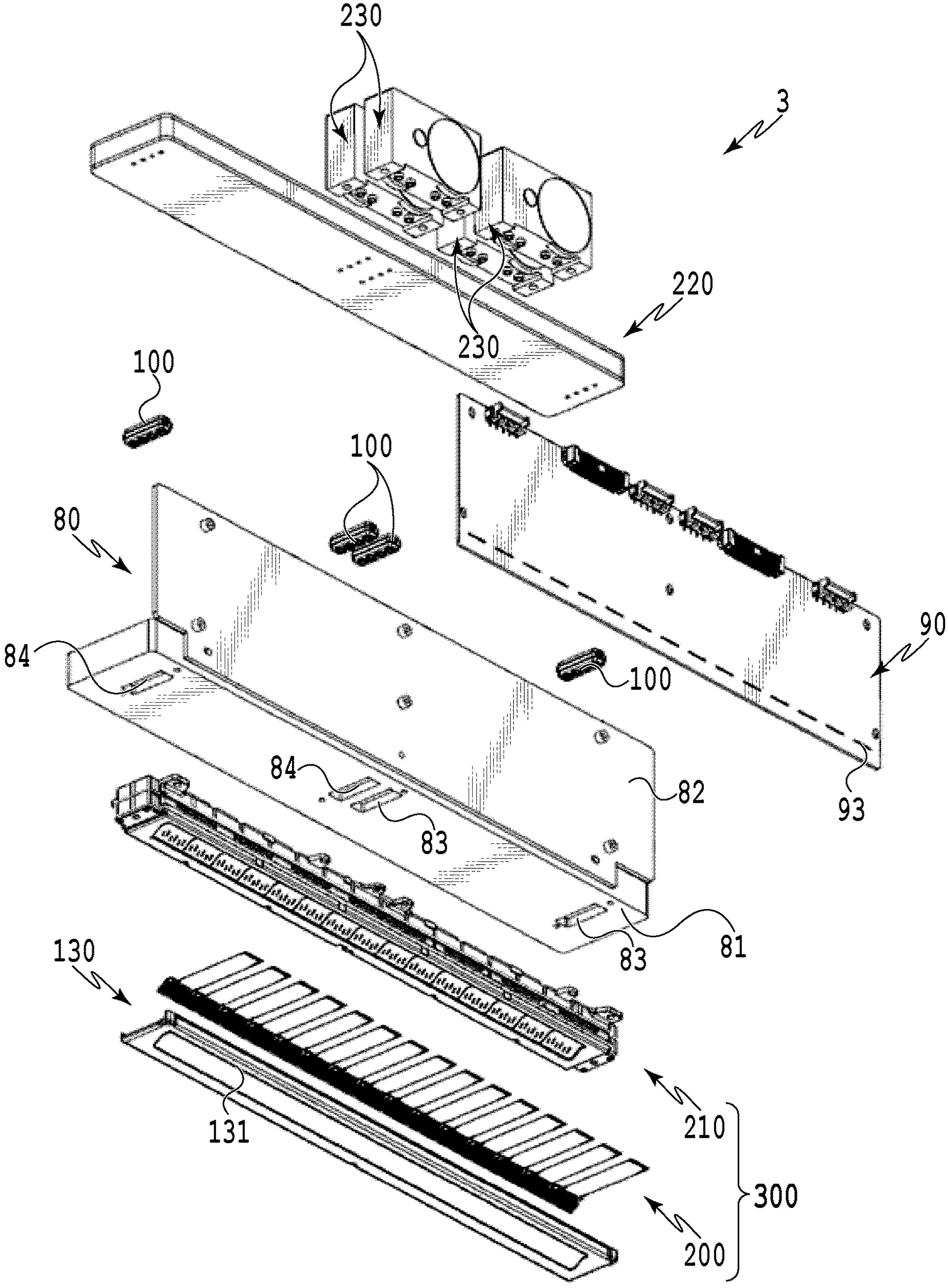
FIG. 4 is an exploded perspective view showing each component or unit constituting the liquid ejection head.

FIG. 4 is an exploded perspective view showing each component or unit constituting the liquid ejection head 3. In the liquid ejection head 3, the liquid ejection unit 300, the liquid supply unit 220, and the electrical wiring board 90 are attached to a housing 80. The liquid supply unit 220 is provided with a liquid connection portion 111 (see FIG. 3B), and filters 221 for each color (for four colors) (see FIG. 2) for removing foreign matter in a supplied ink inside the liquid supply unit 220. The liquid supply unit 220 is supplied with a liquid from the buffer tank 1003, and the liquid that has passed through the filter 221 in the liquid supply unit 220 is supplied to negative pressure control units 230 arranged on the supply unit 220 corresponding to respective colors.

The negative pressure control units 230 are units including a pressure adjustment valve for each color, and a valve, a spring member, and the like are provided inside each of the units. The functions of the valve and spring member can significantly attenuate a pressure drop change in the supply system of the liquid ejection apparatus 1000 (a supply system on the upstream side of the liquid ejection head 3) that occurs due to fluctuations in the flow rate of the liquid. As a result, a negative pressure change on the downstream side (liquid ejection unit 300 side) from the negative pressure control unit 230 can be stabilized within a certain range. Two pressure adjustment valves for each color are built in the negative pressure control unit 230 of each color (see FIG. 2). The two pressure adjustment valves are set to different control pressures. Via the liquid supply unit 220, a high pressure side pressure adjustment valve is in communication with the common supply flow path 211 in the liquid ejection unit 300 and a low pressure side pressure adjustment valve is in communication with the common collecting flow path 212.

The housing 80 includes a liquid ejection unit support portion 81 and an electric wiring board support portion 82, supports the liquid ejection unit 300 and the electric wiring board 90, and secures the rigidity of the liquid ejection head 3. The electric wiring board support portion 82 supports the electric wiring board 90 and is fixed to the liquid ejection unit support portion 81 by screwing. The liquid ejection unit support portion 81 is provided with openings 83, 84 into which a joint rubber 100 is inserted. A liquid supplied from the liquid supply unit 220 is guided to the flow path member 210 constituting the liquid ejection unit 300 via the joint rubber. The liquid ejection unit support portion 81 is made of a metal material such as aluminum or stainless steel.

The liquid ejection unit 300 includes a plurality of ejection modules 200 and a flow path member 210, and a cover member 130 is attached to the surface of the liquid ejection unit 300 on a print medium side. Here, the cover member 130 is a member with a frame-shaped surface provided with a long opening 131, and the print element substrates 10 (see FIG. 3A) and a sealing material portion included in the ejection modules 200 are exposed from the opening 131. A frame portion around the opening 131 has the function of capping the liquid ejection head 3 during print standby as a contact surface of a cap member. Therefore, it is preferable that closed space be formed while the liquid ejection head 3 is capped by applying an adhesive, a sealing material, a filler, or the like along the periphery of the opening 131 to fill unevenness and a gap on an ejection port surface of the liquid ejection unit 300.

Figure 5:
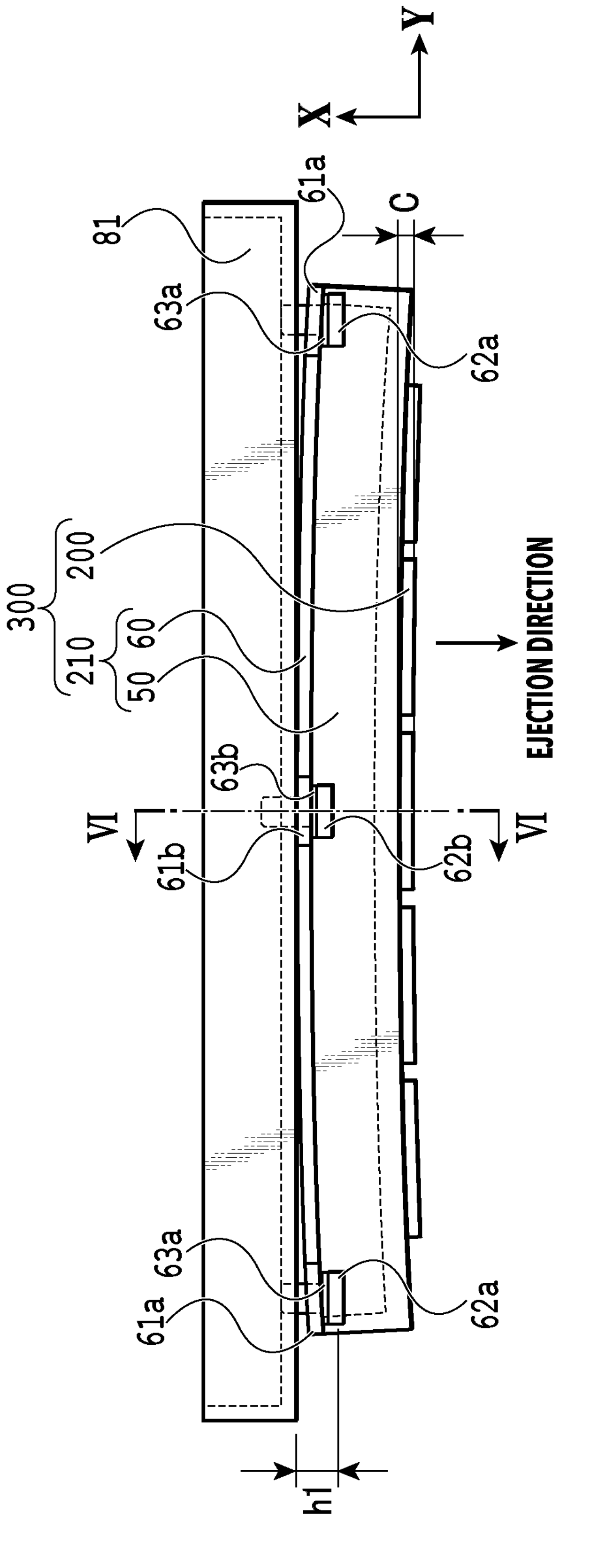
FIG. 5 is a diagram showing a liquid ejection unit supported by a liquid ejection unit support portion.
Figure 6:
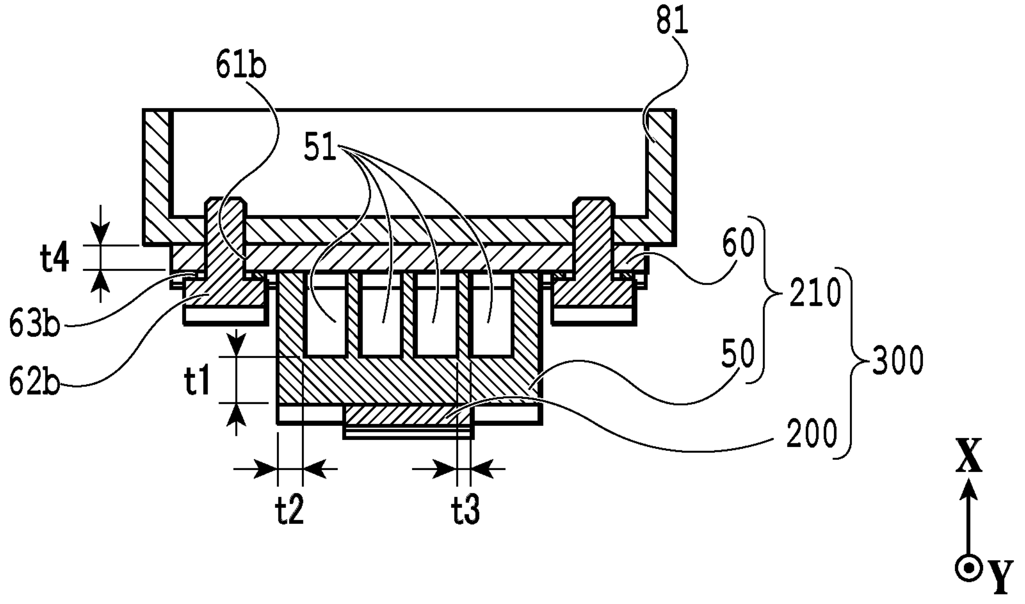
FIG. 6 is a sectional view taken along VI-VI in FIG. 5.

FIG. 5 is a diagram showing the liquid ejection unit 300 supported by the liquid ejection unit support portion (support member) 81 and FIG. 6 is a cross-sectional view taken along VI-VI in FIG. 5. The flow path member (joint member) 210 is made by laminating a first flow path member 50 and a second flow path member 60, distributes the liquid supplied from the liquid supply unit 220 to each ejection module 200, and returns the liquid recirculated from the ejection module to the liquid supply unit 220.

In the liquid ejection head 3, a long flow path forming member is laminated to supply ink to each of the plurality of ejection ports for ejecting a liquid, thereby forming a hollow flow path, and the ejection module is arranged on the flow path forming member. As a method of forming the above-described hollow liquid supply path, a method in which a plurality of components are separately molded and then assembled by ultrasonic welding, adhesion with an adhesive, or the like to form a liquid supply path is commonly known. In the present embodiment, a plurality of flow paths 51 include the box-shaped flow path member 50 joining the ejection modules 200 and the plate-shaped flow path member 60 that serves as a lid for the box-shaped flow path member 50.

The flow path member 210 in the liquid ejection head 3 of the present embodiment is molded into the state of being warped due to a shrinkage difference during molding. That is, the flow path member 210 is formed into a state where the liquid ejection unit 300 is warped. The direction of the warpage is a direction such that the liquid ejection unit 300 is convex in an arrow X direction and is molded into the state of being warped convexly in a predetermined amount in the arrow X direction. The liquid ejection head 3 repeatedly ejects a liquid, so that the liquid ejection unit 300 is warped due to the heat of the heating element. The warpage in this case is warpage convex in the arrow −X direction. Then, the liquid ejection head 3 of the present embodiment includes a liquid ejection unit 300 warped convexly in the arrow X direction at room temperature, and the warpage at room temperature is offset by the warpage of the liquid ejection unit 300 convex in the arrow −X direction during liquid ejection. In this way, performing printing in the state of suppressing the warpage of the liquid ejection unit 300 implements a liquid ejection apparatus capable of printing of high print quality. The method will be described in detail below.

The box-shaped flow path member 50 forms a shape warped convexly in the arrow X direction in a center portion in an arrow Y direction due to a shrinkage difference during injection molding by adjusting a balance among the wall thickness t1 of the joint surface of the ejection module 200, the wall thickness t2 of the side wall in contact with the joint surface, and the wall thickness t3 of a wall between respective flow paths. In the present embodiment, the warpage of the flow path member 50 as a single member is generated due to a shrinkage difference between the joint surface and the side wall of the print element substrate 10 during injection molding. Thus, setting the wall thickness of each wall of the flow path member 50 makes it possible to stably form a flow path member that warps convexly in the arrow X direction. Further, the plate-shaped flow path member 60 has a wall thickness t4 and can be warped by, for example, making a temperature difference between molds on a front surface and a back surface.

The two molded in this way can be joined to obtain a desired warpage amount C. One example of a warpage amount during printing is that in a case where ink whose temperature has been adjusted to 20° C. is supplied to the flow path member 50 and circulated and heat generated from the ejection modules 200 is at 40° C., the liquid ejection unit 300 generates warpage which is about 50 μm convex in the arrow −X direction in the center portion in the arrow Y direction. Thus, for injection molding, also in consideration of a joint between the flow path member 50 and the flow path member 60, after the joint, the wall thicknesses t1, t2, t3, t4 are balanced such that the center portion of the ejection module 20 in the arrow Y direction is warped convexly by about 50 μm with respect to the arrow X direction to set molding conditions.

Specifically, the flow path member 50 has a length of 400 mm, a wall thickness t1 of 2.5 mm, a wall thickness t2 of 2.5 mm, and a wall thickness t3 of 2 mm, and the center portion in the arrow Y direction is warped convexly by 0.2 mm in the arrow X direction by injection molding. Additionally, the flow path member 60 has a wall thickness t4 of 3 mm, and the center portion in the arrow Y direction is warped convexly by 0.1 mm in the arrow −X direction by injection molding. Thus, the flow path member 50 and the flow path member 60 molded by being warped in opposite directions are adhered and fixed in a flatly straightened state, and finally the liquid ejection unit 300 in which the center portion of the ejection module 20 is warped convexly by about 50 μm in the arrow X direction is formed.

In the present embodiment, it has been described that the flow path member 50 and the flow path member 60 have warpage in opposite directions, but the direction of the warpage is not limited to them. That is, it is only required that, by being joined to each other, the flow path member 50 and the flow path member 60 be warped in a direction that offsets the warpage of the liquid ejection unit 300 due to a temperature rise caused by ejection.

The liquid ejection unit 300 is provided with hole portions 61*a* at four corners of the flow path member 60. At the four corners, a fixing member 62*a* is fixed to the liquid ejection unit support portion 81 at a predetermined height h1, and a biasing member 63*a* biases the liquid ejection unit 300. Therefore, at the four corners of the flow path member 60, the liquid ejection unit support portion 81 and the flow path member 60 are separated from each other. The predetermined height h1 is, for example, 50 μm in a case where the assumed value of the warpage amount is 50 μm, that is, just about a sum of the thickness of the basing member 63*a* in a shrunk state and the thickness of the flow path member 60. Further, a biasing force of the biasing member 63*a* is only enough to eliminate a rattle between a hole portion 61*a* and the head of the fixing member 62*a* and is not a force enough to correct the warpage of the liquid ejection unit 300.

The fixing member 62*a* set to a predetermined height and the biasing member 63*a* can absorb variations in the warpage amount of the liquid ejection unit 300 and keep them within a desired range. Further, in the center portion, the flow path member 60 is provided with a hole portion 61*b*, and a fixing member 62*b* crushes the biasing member 63*b* to fix the liquid ejection unit 300 to the liquid ejection unit support portion 81. That is, in the center portion, the flow path member 60 is fixed to be inseparable from the liquid ejection unit support portion 81.

Figure 7:
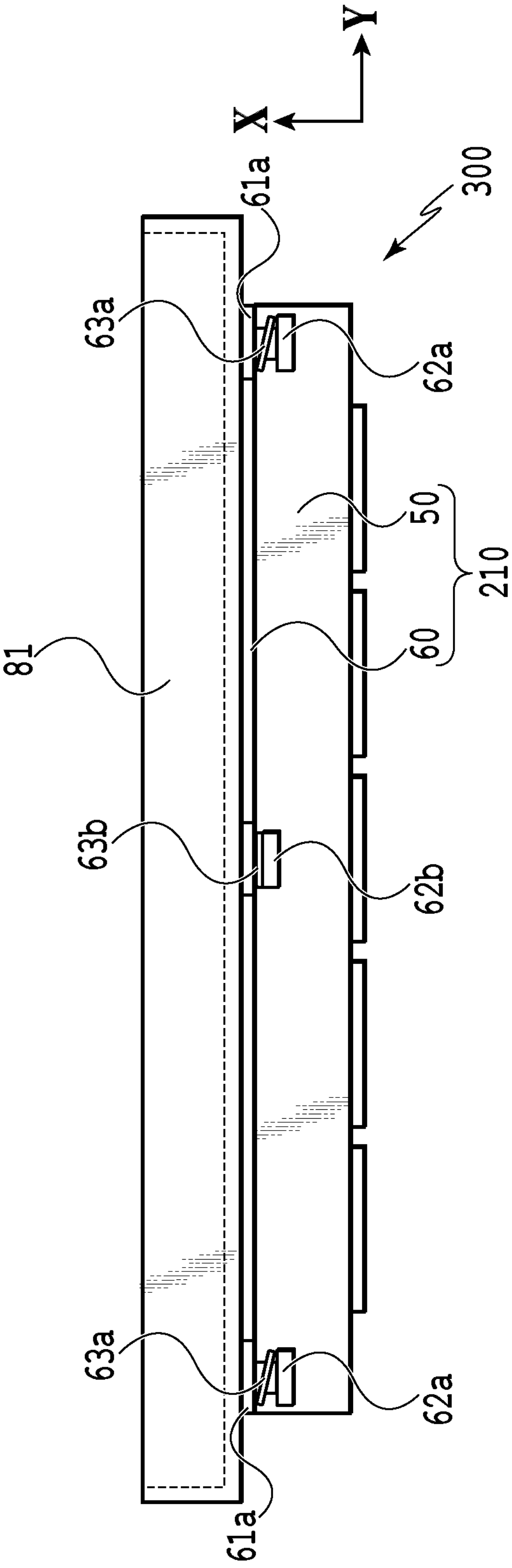
FIG. 7 is a diagram showing the liquid ejection unit supported by the liquid ejection unit support portion.

FIG. 7 is a diagram showing the liquid ejection unit 300 supported by the liquid ejection unit support portion 81 during printing. The liquid ejection unit 300 warps convexly in the arrow −X direction due to a temperature rise during printing. However, since the center portion of the liquid ejection unit in the arrow Y direction is fixed to the liquid ejection unit support portion 81 by the fixing member 62*b*, both end portions of the liquid ejection unit are formed along the liquid ejection unit support portion 81 and the biasing member 63*a* extends to eliminate the rattle with the head of the fixing member 62*a*. Since the warpage amount of the liquid ejection unit 300 at room temperature is set to be the same as a warpage amount generated by the temperature rise during printing, the liquid ejection unit 300 is substantially parallel to the liquid ejection unit support portion 81 during printing and the ejection surface is almost flat. In the present invention, the center portion of the liquid ejection unit refers to an area located in the center in a case where the liquid ejection unit is divided into three equal parts in the arrow Y direction. Additionally, in the present invention, both end portions of the liquid ejection unit refer to areas located at both ends in a case where the liquid ejection unit is divided into three equal parts in the arrow Y direction.

According to the method of the present embodiment, since the temperature rise relating to printing reduces the warpage generated due to the shrinkage difference during molding, the warpage can be restored in a natural manner. As the ejection surface becomes flat, an ink ejection direction becomes orthogonal to a print medium, and a distance from the print medium also becomes uniform, so that high-quality printing can be performed. In a case where the position reference of the liquid ejection unit 300 is in the center portion, a position change is small and this form is specifically effective.

In this embodiment, the example has been described in which in a case where the temperature rise due to the ejection makes the liquid ejection unit 300 convex in the liquid ejection direction, the liquid ejection unit 300 is formed by being warped in a direction opposite to the liquid ejection direction, but the present invention is not limited to this. That is, it is only required that the liquid ejection unit 300 have warpage that offsets the warpage of the liquid ejection unit 300 due to the temperature rise caused by the ejection.

In this way, both end portions in the arranging direction of the print element substrate of the liquid ejection unit 300 having warpage convex in a predetermined direction are fixed to the liquid ejection unit support portion 81 with the fixing member and the biasing member which is combined with the fixing member and can bias an object to be fixed by the fixing object. Thus, it is possible to provide a liquid ejection head with which print of good print quality can be obtained and a method of manufacturing the liquid ejection head.

Second Embodiment

A description will be given below of a second embodiment of the present invention with reference to the drawings. Since a basic configuration of the present embodiment is the same as that of the first embodiment, a characteristic configuration will be described below.

Figure 8:
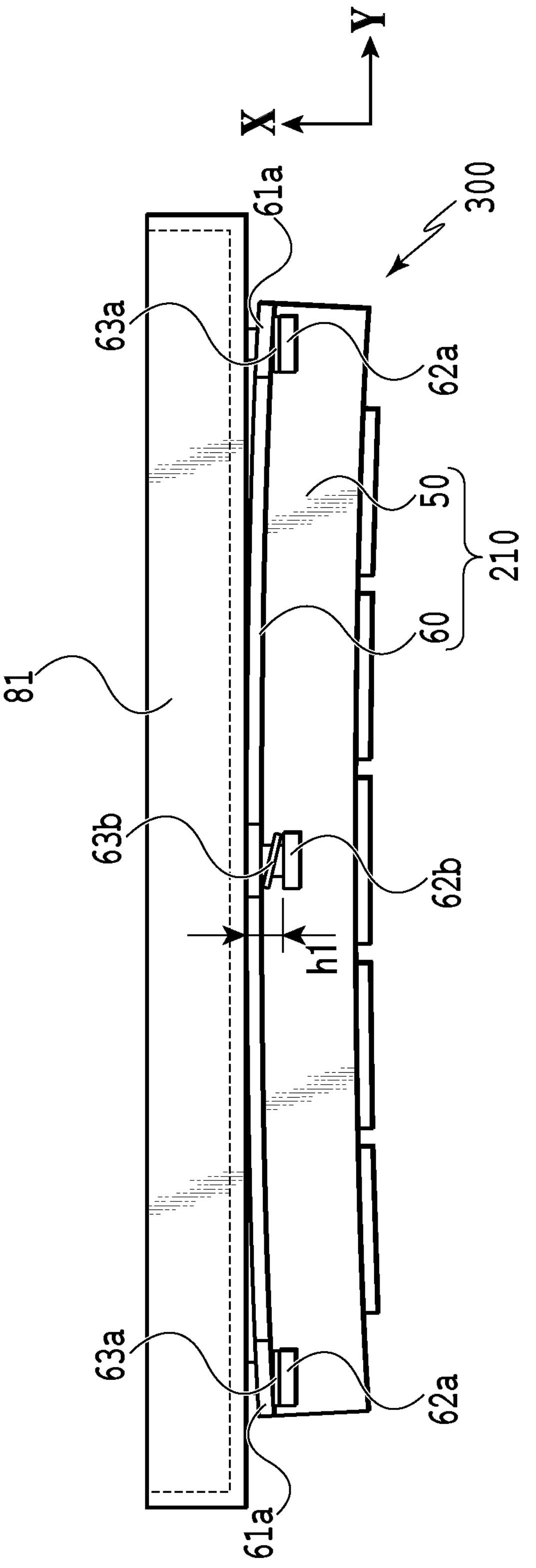
FIG. 8 is a diagram showing the liquid ejection unit supported by the liquid ejection unit support portion.
Figure 9:
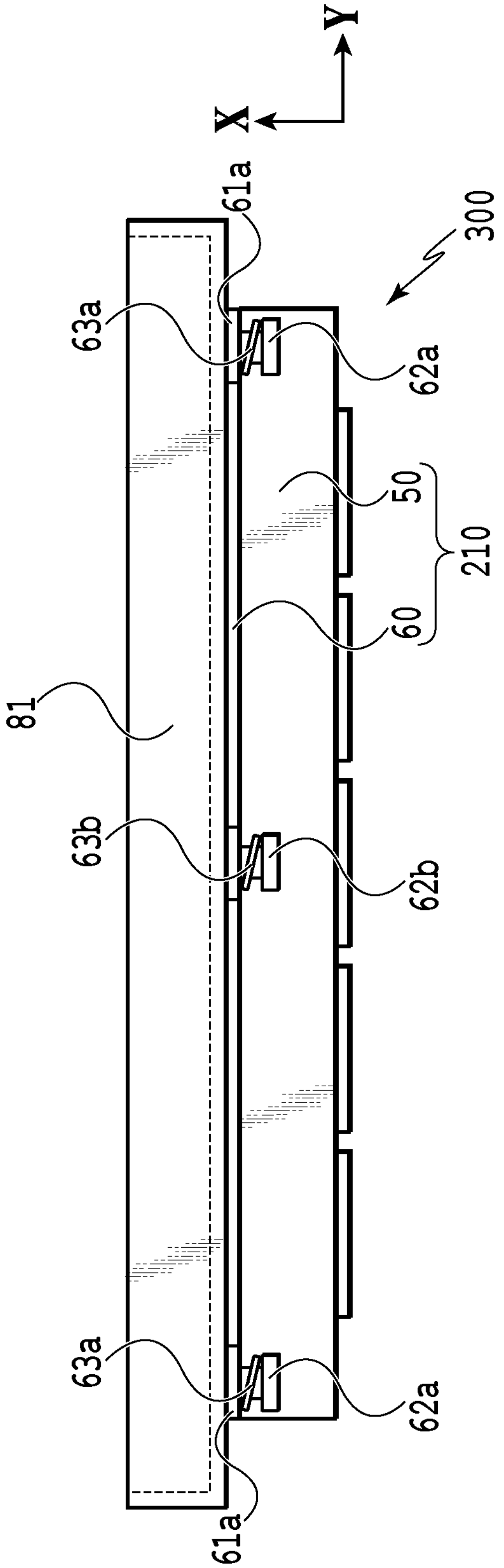
FIG. 9 is a diagram showing the liquid ejection unit supported by the liquid ejection unit support portion.

FIGS. 8 and 9 are diagrams showing the liquid ejection unit 300 supported by the liquid ejection unit support portion 81 in the present embodiment. In the first embodiment, in the center portion of the liquid ejection unit 300 in the arrow Y direction, the fixing member 62*b* crushes the biasing member 63*b* and fixes the liquid ejection unit 300 to the liquid ejection unit support portion 81.

In a case where the liquid ejection unit 300 is warped convexly in the arrow −X direction due to a temperature rise during printing, it is possible that a warpage amount exceeds the amount of warpage convex in the arrow X direction formed at room temperature. At that time, in the case of being fixed with no gap by the fixing member 62*b* in the center portion of the liquid ejection unit 300 in the arrow Y direction as in the first embodiment, the liquid ejection unit 300 is warped convexly in the arrow −X direction between the fixing member 62*a* and the fixing member 62*b*. That is, W-shaped convex warpage occurs in the two arrow −X directions so as to sandwich the fixing member 62*b*. In a case where such W-shaped warpage occurs in the liquid ejection unit 300, the landing position of the ejected ink is disrupted, and the print quality is greatly affected. As a result, there is a possibility that uniform printing may not be achieved.

Then, in the present embodiment, as shown in FIG. 8, in the liquid ejection head 3, in holding the warped liquid ejection unit 300 to the liquid ejection unit support portion 81, the fixing member 62*b* in the center portion is fixed at the predetermined height h1 like the fixing member 62*a* at the end portion. Accordingly, in a stretched state, the biasing member 63*b* biases the center portion of the liquid ejection unit 300 to the liquid ejection unit support portion 81 to eliminate a rattle.

During printing, as shown in FIG. 9, both end portions of the liquid ejection unit 300 are formed along the liquid ejection unit support portion 81, and the biasing member 63*a* extends to eliminate a rattle with the head of the fixing member 62*a*. By holding the center portion of the liquid ejection unit 300 not by fixing it but by a biasing force, the liquid ejection unit 300 pushes up the biasing member 63*b* in the center portion within a range of the predetermined height h1 even in a case where the amount of warpage due to a temperature rise during printing exceeds the amount of warpage formed at room temperature. The liquid ejection unit 300 pushes up the biasing member 63*b*, so that warpage occurs as a whole, but no W-shaped warpage occurs. In a state where convex warpage occurs instead of W-shaped warpage in the liquid ejection unit 300 as a whole, uniform print is possible and it is possible to suppress a disruption in the landing position of ejected ink.

As described above, even in a case where the center portion of the liquid ejection unit 300 in the arrow Y direction is held not by being fixed but by a biasing force, it is possible to obtain a liquid ejection head with which print of good print quality can be obtained.

Third Embodiment

A description will be given below of a third embodiment of the present invention with reference to the drawings. Since a basic configuration of the present embodiment is the same as that of the first embodiment, a characteristic configuration will be described below.

Figure 10:
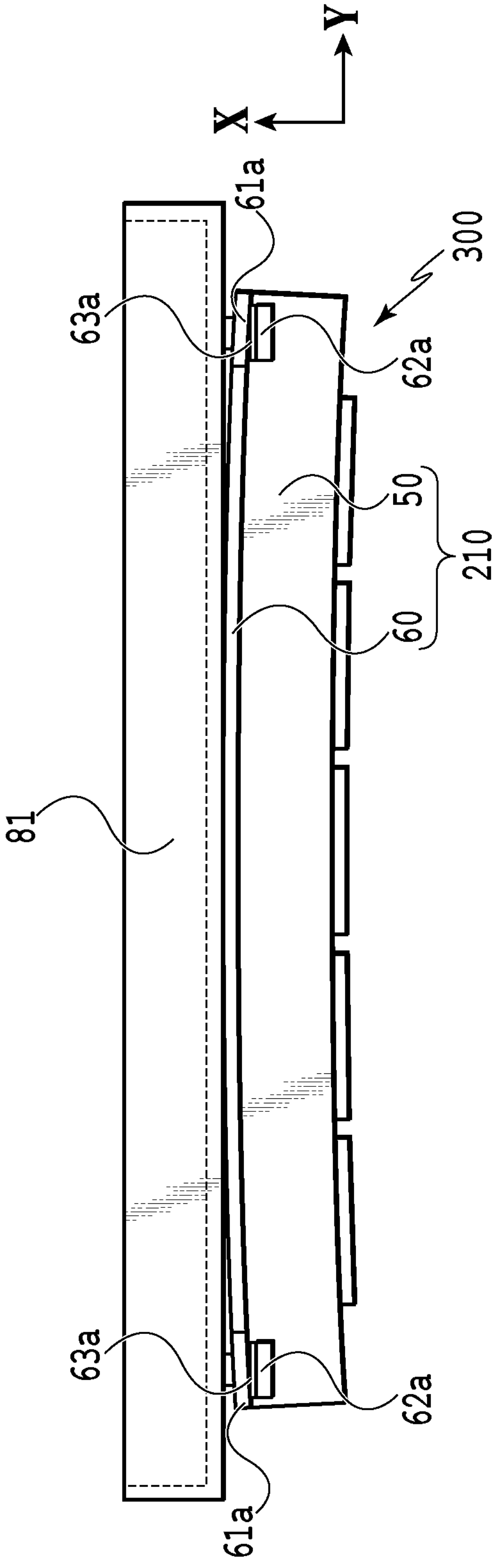
FIG. 10 is a diagram showing the liquid ejection unit supported by the liquid ejection unit support portion.
Figure 11:
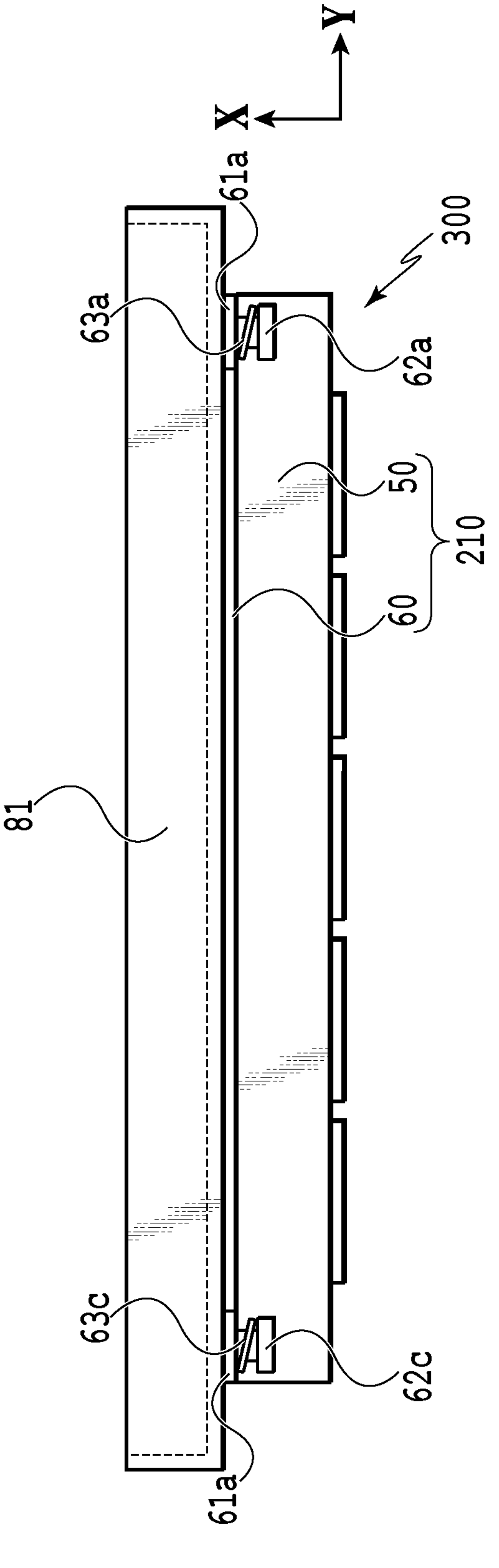
FIG. 11 is a diagram showing the liquid ejection unit supported by the liquid ejection unit support portion.

FIGS. 10 and 11 are diagrams showing the liquid ejection unit 300 supported by the liquid ejection unit support portion 81 in the present embodiment. In the second embodiment, it has been described that the liquid ejection unit 300 is held by the biasing force generated by the biasing member 63*b* in the center portion of the liquid ejection unit 300 in the arrow Y direction. In the present embodiment, the liquid ejection unit 300 is held by the fixing member 62*a* and the biasing member 63*a* provided at both ends without being held in the center portion of the liquid ejection unit 300 in the arrow Y direction. That is, in the center portion of the liquid ejection unit 300 in the arrow Y direction, the liquid ejection unit 300 is held so as to be separable from the liquid ejection unit support portion 81.

During printing, as shown in FIG. 11, both end portions of the liquid ejection unit 300 are formed along the liquid ejection unit support portion 81, and the biasing member 63*a* extends to eliminate a rattle with the head of the fixing member 62*a*. Since the center portion of the liquid ejection unit 300 is not held, no W-shaped warpage occurs in the liquid ejection unit 300 even in a case where the amount of warpage due to a temperature rise during printing exceeds the amount of warpage formed at room temperature. Accordingly, as in the second embodiment, uniform print is possible and it is possible to suppress the disruption of the landing position of ejected ink.

Fourth Embodiment

A description will be given below of a fourth embodiment of the present invention with reference to the drawings. Since a basic configuration of the present embodiment is the same as that of the first embodiment, a characteristic configuration will be described below.

Figure 12:
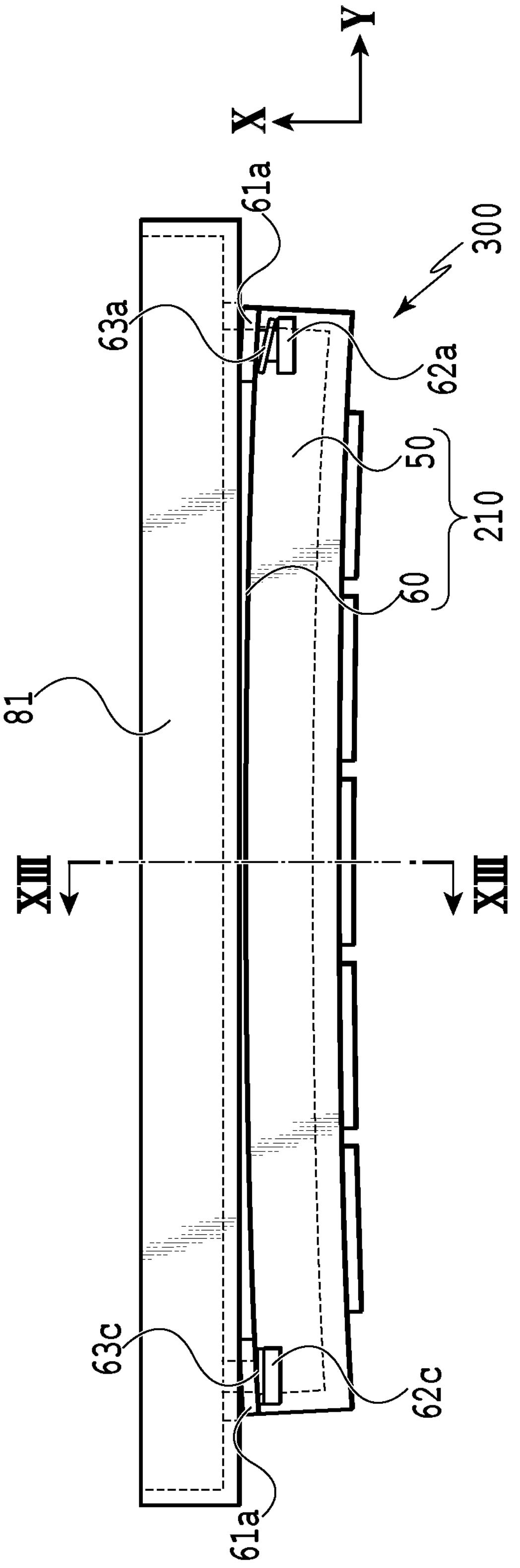
FIG. 12 is a diagram showing the liquid ejection unit supported by the liquid ejection unit support portion.
Figure 13:
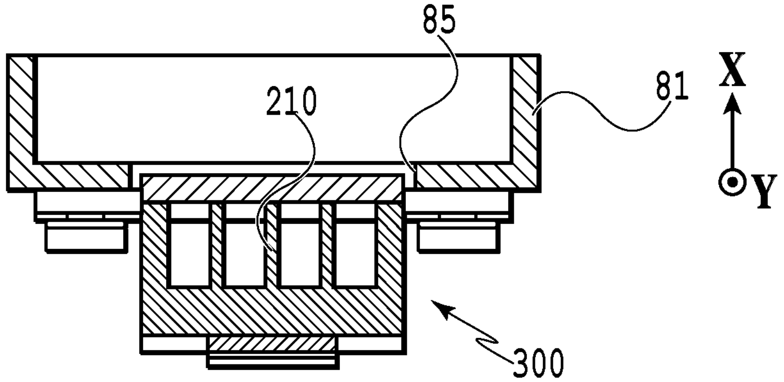
FIG. 13 is a sectional view taken along XIII-XIII in FIG. 12.
Figure 14:
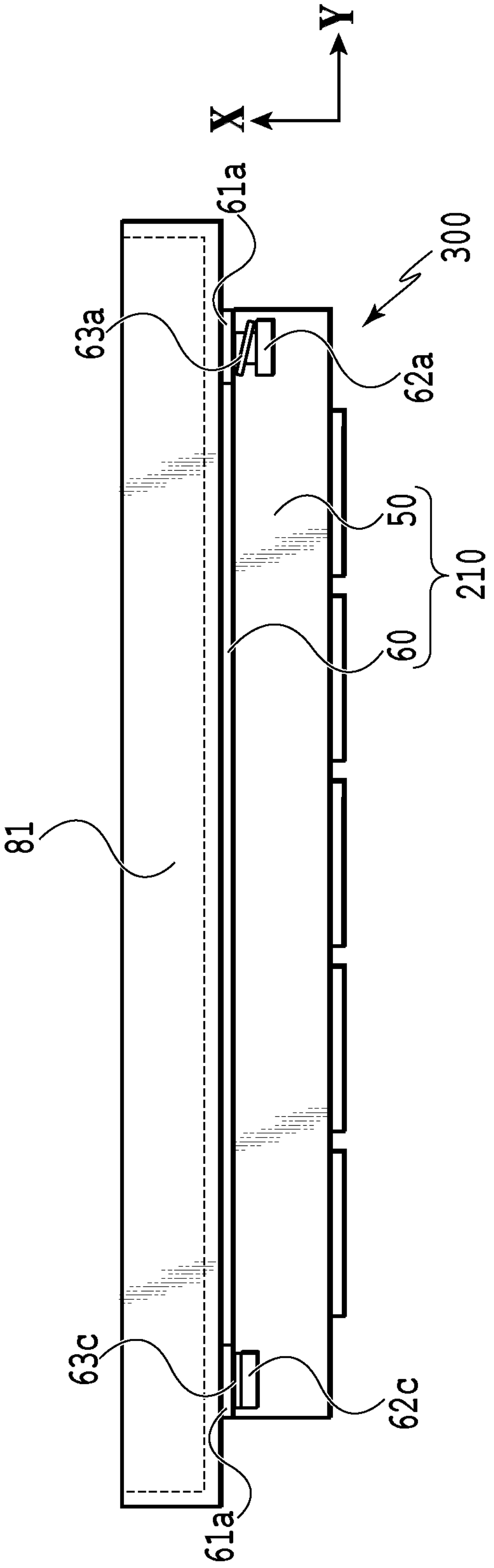
FIG. 14 is a diagram showing the liquid ejection unit supported by the liquid ejection unit support portion.

FIG. 12 is a diagram showing the liquid ejection unit 300 supported by the liquid ejection unit support portion 81 in the present embodiment, and FIG. 13 is a sectional view taken along XIII-XIII in FIG. 12. FIG. 14 is a diagram showing the liquid ejection unit 300 supported by the liquid ejection unit support portion 81 during printing. In the liquid ejection head 3 of the present embodiment, the liquid ejection unit support portion 81 has an opening (opening portion) 85, and a portion of the flow path member 210 enters the opening 85. Further, in holding the warped liquid ejection unit 300 to the liquid ejection unit support portion 81, the fixing member 62*c* crushes the biasing member 63*c* and the liquid ejection unit 300 is fixed to the liquid ejection unit support portion 81 in one end portion. In the other end portion, the fixing member 62*a* and the biasing member 63*a* bias and hold the liquid ejection unit 300 to the liquid ejection unit support portion 81. Since a portion of the flow path member 210 is configured to enter the opening 85, the warped liquid ejection unit 300 can be held without being deformed.

During printing, as shown in FIG. 14, the warpage is offset due to a temperature rise, and the liquid ejection unit 300 takes a flat shape. In a case where the position reference of the liquid ejection unit 300 is on one end side, in a case where the fixing member 62*c* crushes the biasing member 63*c* and the liquid ejection unit 300 is fixed to the liquid ejection unit support portion 81 on a reference side, a position change is small and this form is specifically effective.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-109358, filed Jun. 30, 2021, which is hereby incorporated by reference herein in its entirety.

What is claimed is:

1. A liquid ejection head comprising:

an element substrate comprising a plurality of ejection ports configured to eject a liquid and an element configured to generate energy for ejecting the liquid from the ejection ports;

a first flow path member comprising a surface on which the plurality of element substrates are arranged and mounted and a portion of a flow path through which the ejection ports are supplied with the liquid;

a second flow path member configured to form a liquid supply member comprising the flow path by being laminated with the first flow path member, the liquid supply member being warped convexly in a first direction during ejection of the liquid; and a support member configured to support the liquid supply member, wherein the liquid supply member warped concavely in the first direction in a state in which no liquid is ejected has two end portions with respect to an arranging direction in which the element substrates are arranged, both the end portions being fixed to the support member by a fixing member and a biasing member which is combined with the fixing member and can bias the liquid supply member to be fixed by the fixing member.

2. The liquid ejection head according to claim 1, wherein the support member is formed of a material made of metal which is aluminum or stainless steel and has higher rigidity than that of the liquid supply member.

3. The liquid ejection head according to claim 1, wherein the first flow path member and the second flow path member are formed by injection molding and are warped due to a shrinkage difference during injection molding.

4. The liquid ejection head according to claim 3, wherein the first flow path member has a first predetermined amount of warpage as a single member, and the second flow path member has a second predetermined amount of warpage as a single member.

5. The liquid ejection head according to claim 4, wherein the first predetermined amount of warpage of the first flow path member is warpage in a direction opposite to a direction of the second predetermined amount of warpage of the second flow path member.

6. The liquid ejection head according to claim 1, wherein a predetermined amount of warpage concave in the first direction is formed by laminating the second flow path member on the first flow path member.

7. The liquid ejection head according to claim 6, wherein the predetermined amount of warpage concave in the first direction of the liquid supply member is offset by warpage convex in the first direction during ejection of the liquid.

8. The liquid ejection head according to claim 1, wherein the liquid supply member having a predetermined amount of warpage concave in the first direction abuts the support member in a center portion in the arranging direction and is fixed separately from the support member at both the end portions.

9. The liquid ejection head according to claim 8, wherein the liquid supply member is fixed by the fixing member in the center portion in a state of being inseparable from the support member.

10. The liquid ejection head according to claim 8, wherein the liquid supply member is fixed in the center portion in a state of being separable from the support member.

11. The liquid ejection head according to claim 10, wherein the liquid supply member is fixed in the center portion by a biasing force of the biasing member.

12. The liquid ejection head according to claim 1, wherein the support member has an opening portion, and the liquid supply member abuts the support member at one end portion in the arranging direction, is separated from the support member at the other end portion in the arranging direction, and is fixed to the support member with a portion of the liquid supply member entering the opening portion.

13. The liquid ejection head according to claim 12, wherein the liquid supply member is fixed by the fixing member at the one end portion so as to be inseparable from the support member and is fixed by the biasing force of the biasing member at the other end portion.

* * * * *